United States Patent [19]
Alexander

[11] Patent Number: 5,141,093
[45] Date of Patent: Aug. 25, 1992

[54] AUTOMOTIVE BODY PANEL HANDLING APPARATUS

[75] Inventor: Robert O. Alexander, West Bloomfield, Mich.

[73] Assignee: Progressive Tool & Industries Co., Southfield, Mich.

[21] Appl. No.: 686,676

[22] Filed: Apr. 17, 1991

[51] Int. Cl.⁵ .............................................. B65G 21/20
[52] U.S. Cl. ............................ 198/345.1; 198/346.2; 198/378; 29/783; 29/794; 29/822; 269/56
[58] Field of Search ............... 198/345.1, 345.2, 346.1, 198/346.2, 378; 29/783, 791, 794, 822, 281.1; 269/13, 14, 20, 56, 309, 310

[56] References Cited

U.S. PATENT DOCUMENTS

| | | |
|---|---|---|
| 2,779,092 | 1/1957 | Gordon |
| 4,411,354 | 10/1983 | Thibault et al. |
| 4,494,687 | 1/1985 | Rossi |
| 4,557,371 | 12/1985 | Yonezawa ...................... 198/803.01 |
| 4,589,184 | 5/1986 | Asano et al. ...................... 29/791 X |
| 4,670,961 | 6/1987 | Fontaine et al. |
| 4,698,475 | 10/1987 | Lothenbach et al. ..... 198/803.01 X |
| 4,736,515 | 4/1988 | Catena ............................. 29/783 X |
| 5,040,290 | 8/1991 | Usui et al. ...................... 29/281.1 X |

FOREIGN PATENT DOCUMENTS

| | | |
|---|---|---|
| 57-83328 | 5/1982 | Japan |
| 2089296 | 6/1982 | United Kingdom |
| 2114067 | 8/1983 | United Kingdom |

Primary Examiner—Robert P. Olszewski
Assistant Examiner—Dean A. Reichard
Attorney, Agent, or Firm—Basile and Hanlon

[57] ABSTRACT

Apparatus for conveying panels, such as vehicle body side panels to and from work stations located at spaced locations along a conveyor includes a panel support frame mounted on the conveyor for movement along the conveying path with the support frame in an elevated generally horizontal conveying position. The support frame carries a plurality of mechanically actuable releasable clamps adapted to retain a panel engaged against a group of locator pads fixedly mounted on one side of the support frame. A second group of locator pads movably mounted on the frame are normally biased into engagement with the panel at spaced locations around its periphery to hold the panel in a predetermined position laterally of the support frame. The support frame mounts an actuator member coupled to all of the clamps to position all clamps in a panel clamping position when the actuator member is in a first position and to position all clamps in a panel release position when the actuator is in a second position. A spring biased latch on the support frame normally locks the actuator member against movement from either of its positions. The conveyor includes a manipulator operable when the support frame is at a work station to pivot the support frame downwardly from its conveying position to a downwardly inclined transfer position. Actuating devices located at the work station are operable when the support frame is in its transfer position to release the latch, disengage the movable locator pads and shift the clamp actuator member between its first and second positions.

13 Claims, 7 Drawing Sheets

AUTOMOTIVE BODY PANEL HANDLING APPARATUS

BACKGROUND OF THE INVENTION

The present invention is directed to a handling apparatus employed to handle panel like articles, such as the main body panel components which are to be subsequently assembled as a unitized vehicle body, to successively advance the panels to each of a series of work stations on a production line basis.

In the assembly of a unitized body, the first step in the assembly or framing of the body brings together at the first framing station on the body assembly production line various major panels, locates the panels in assembled relationship with each other and, while the panels are so located, robotic welders weld the panels to each other to form a vehicle body shell. Typically, this first step in the framing process will involve a vehicle body floor panel, right and left hand side panels, a fire wall panel and a roof panel or roof header members extending transversely between the upper portions of the body side panels. Once the panels are assembled to each other at the first framing station, access to portions of the individual panels at the interior of the body shell becomes restricted, and it is thus conventional practice to perform several preassembly steps on the individual panels before they are advanced to the framing station. In the case of a body side panel, for example, the panel is initially stamped from sheet metal, and is then advanced through a series of work stations where additional parts, such as door latch and hinge reinforcements, mounting brackets, stiffeners, etc., are welded in place on the sheet metal stamping.

In a commonly owned copending application, filed Jan. 12, 1990, now U.S. Pat. No. 4,991,707 there is disclosed a conveyor for conveying a body side panel to a series of work stations where the preframing operations referred to above are performed on the body side panel. The conveying system of the aforementioned application, now U.S. Pat. No. 4,991,707, includes a carrier mounted for movement along an elevated horizontal path extending past a series of work stations. A generally rectangular open support frame is mounted along one edge upon the carrier for pivotal movement relative to the carrier about a horizontal axis parallel to the conveying path. While the carrier is being advanced from one work station to the next, the support frame is maintained in a horizontal elevated position well clear of the plant floor. The body side panel, during this transfer step, is held against the underside of the support frame by what will be referred to generally as a plurality of clamps. Upon arrival at a work station, the carrier is stopped and a manipulator associated with the conveyor pivots the support frame downwardly to a vertically inclined or vertical position relative to the carrier to locate the body side panel in adjacent relationship with a stationary panel receiving work frame at the work station. The panel is transferred to the stationary work frame and the support frame is then pivoted back upwardly to its horizontal position clear of the panel on the work frame. After the work operations have been performed on the panel while the panel is held on the stationary work frame, the support frame is again pivoted downwardly, the panel is reclamped to the support frame, and the support frame with the panel is then pivoted back upwardly to its horizontal position relative to the carrier for advancement to the next work station.

In the body side panel conveying system described above, the irregular shape of the body side panel requires that several individual releasable clamps be located upon the support frame to positively retain the side panel upon the frame during transit from one stationary panel receiving frame to the next. To facilitate transfer of the side panel back and forth between the support frame and stationary work frame, it is essential that all of the several clamps be simultaneously released or engaged. Because of the length of the conveying path and the requirement of pivotal movement of the support frame relative to its carrier, it is impractical to connect pneumatic supply lines or electrical cables to the individual support frames to pneumatically or electrically actuate the clamping devices. The clamps, and the clamp actuating devices must thus be so designed that the clamps are positively retained in their clamping position during transfer movement of the support frame and positively retained in their unclamped configuration while the support frame is separated from the panel at the work station.

The present invention is especially directed to a clamping system in which a plurality of individual clamping or positioning devices carried upon the support frame may be simultaneously shifted between their respective panel clamping or retaining positions and respective released or retracted positions and in which the clamps or locators are positively retained in either of their actuated or released positions.

SUMMARY OF THE INVENTION

In accordance with the present invention, a support frame adapted to be mounted along one edge upon the carrier of a conveyor as described above is formed as an open frame of a configuration determined by the shape of the side panel which is to be handled by the frame. For purposes of description, the support frame may be considered as a generally flat rectangular frame whose outer dimensions approximate the length and height of the side panel to be handled so that the side panel can be mounted in a stable position upon one side of the frame.

To locate and retain a side panel upon the frame, a number of locating and panel retaining devices or clamps are mounted at various locations upon the frame chosen such that they will cooperatively retain a side panel in a fixed preselected position relative to the frame.

Two types of locating devices are employed. The first type of locating device consists simply of a pad fixedly mounted upon the support frame to engage the outer side surface of the body panel which, when it is retained upon the support frame, faces the support frame. A second type of locating device takes the form of a pad which is movable between a first position in which it engages an edge surface of the body side panel and a retracted position in which the locating pad is retracted clear of the body panel to accommodate loading or unloading of the panel to or from the support frame.

In addition to the two types of locating devices, a number of panel retaining or clamping devices are mounted at appropriate locations on the support frame. Typically the clamping or retaining device will include a generally L-shaped panel engaging member pivotably mounted upon the support frame for movement between a retaining position in which the retaining member projects inwardly beyond an edge of the panel to engage the inner side of the panel to lightly clamp the panel against the stationary locating pads described above.

An actuating shaft is mounted upon the support frame for rotary oscillation about a shaft axis which is fixed relative to the support frame. An actuating crank is fixed at one end to the shaft and carries a roller at its distal end. Other crank arms fixed to the shaft are individually coupled by links to the respective clamping or retaining members in a manner such that when the actuating shaft is at one end limit of rotary oscillation, all clamps are in their panel retaining position, and when the actuating shaft is at its opposite end limit of movement, all clamps are located in their panel releasing or retracted positions. A spring biased pawl is mounted upon the support frame to positively lock the actuating shaft at either of its end limits of rotary oscillation to thereby positively retain the clamps in either of their panel retaining or panel release positions.

Each work station is provided with a power driven clamp actuating device and a pawl releasing device. The pawl releasing device at the work station consist simply of a stationary abutment located to engage and release the pawl on the support frame as the support frame approaches its end limit of downward pivotal movement toward the stationary panel receiving work frame at the work station. The clamp actuating device includes a drive member mounted for rotation about a fixed horizontal axis at the work station and having an upwardly opening U-shaped recess which will receive the roller on the actuating crank on the support frame when the support frame is at its downward end limit of movement toward the panel receiving frame at the work station. A drive motor is operable to position the drive member at either of two end limits of rotary oscillation which correspond to the opposite end limits of rotary oscillation of the actuating shaft on the support frame. The drive member is normally located in a position corresponding to the clamped position of the actuating shaft. As the support frame pivots downwardly upon the conveyor to its end limit of movement toward the stationary panel receiving frame, the crank roller of the actuating shaft enters the U-shaped recess in the drive member. The drive member drive motor is then actuated to shift the drive member to its opposite end limit of rotary movement and in so doing, the engagement of the drive member with the crank roller rotates the actuating shaft to its clamps released position. As described above, after the side panel has been transferred from the support frame to the panel receiving frame, the support frame is pivoted back upwardly on the conveyor to its horizontal position with all clamps released. After the work operation has been performed upon the body panel, the support frame is pivoted back downwardly and, as it approaches its end limit of pivotal movement toward the panel receiving frame, the crank roller again enters the U-shaped recess in the drive member. After the body panel has been positioned upon the support frame, the drive member is driven back to its other end limit of rotary oscillation, and this movement of the drive member drives the crank roller to rotate the actuating shaft on the support frame to reset the clamps.

The various locating pads on the support frame may likewise be actuated and released from the actuating shaft or the pad may alternatively be provided with a cam like actuating arm which engages a roller or abutment mounted at a fixed location at the work station to pivot the locating member upon the support frame to its released position as the support frame approaches the stationary panel frame, in the same manner as the pawl release abutment releases the pawl.

Other objects and features of the invention will become apparent by reference to the following specification and to the drawings.

IN THE DRAWINGS

DETAILED DESCRIPTION OF THE PREFERRED EMBODIMENT

Figure 1:
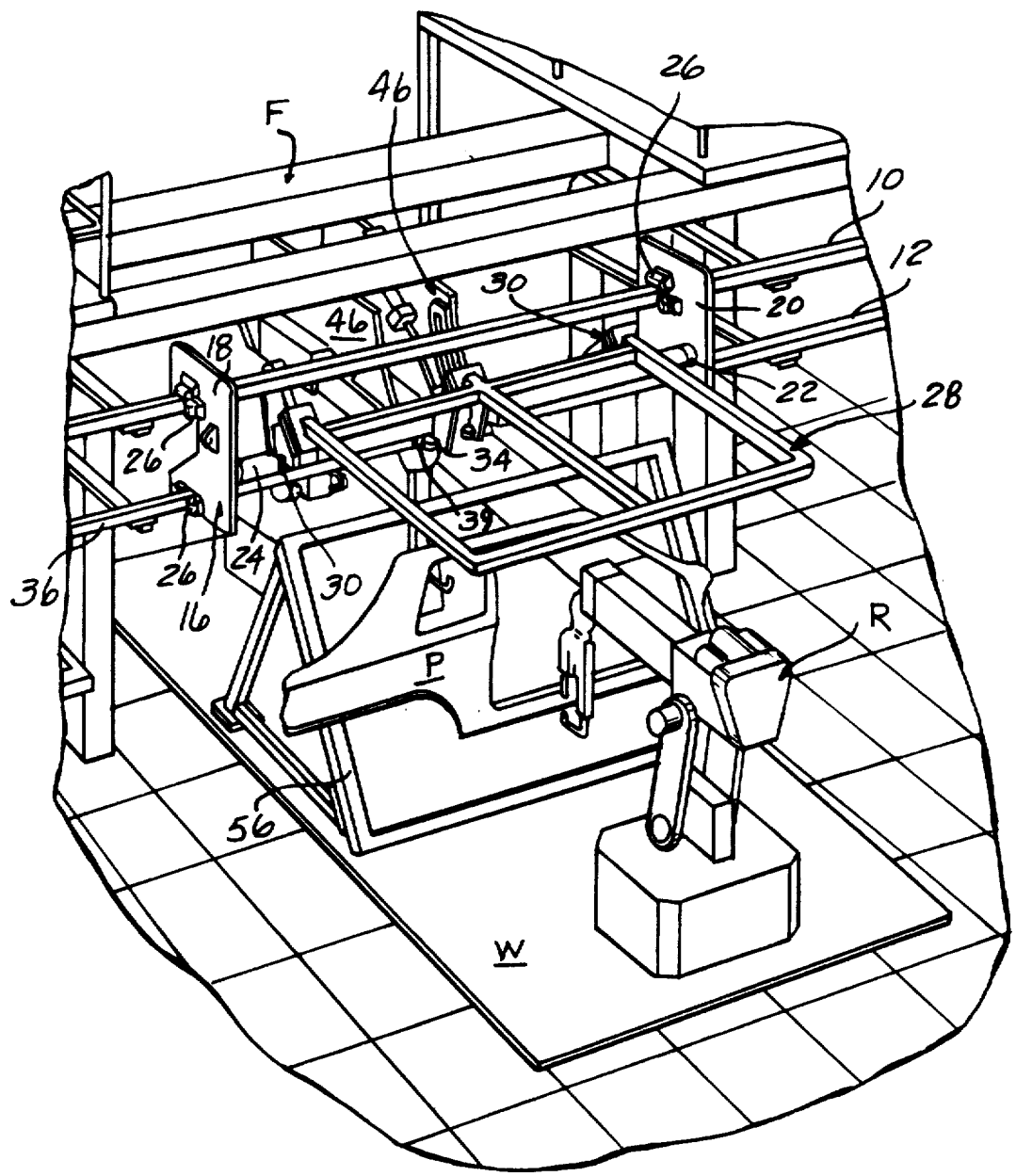
FIG. 1 is a simplified perspective view with various parts omitted of a conveying system and work station to which the present invention is applicable.
Figure 2:
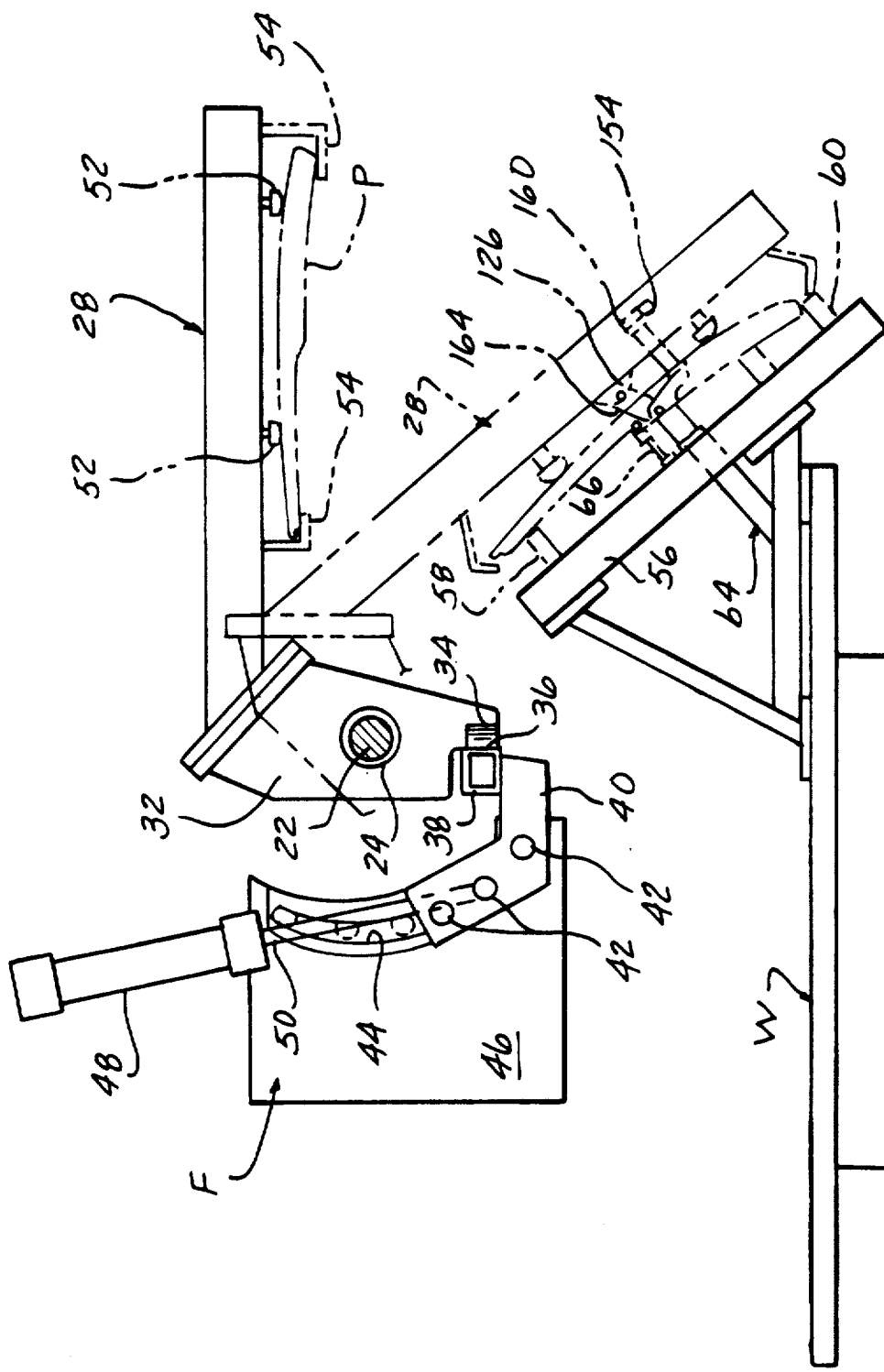
FIG. 2 is a simplified end view showing a portion of the conveying system shown in FIG. 1 and a somewhat modified form of work station.

Referring first to FIGS. 1 and 2, a conveying system of the type which employs the present invention is disclosed in simplified form with many structural details omitted. A conveying system of the type shown in FIGS. 1 and 2 is disclosed and described in detail in a commonly owned copending application, filed Jan. 12, 1990, now U.S. Pat. No. 4,991,707 to which reference may be had for further details of the system in general.

The conveyor system in question includes a pair of horizontally extending rails 10 and 12 which are fixedly mounted upon the fixed frame F of the conveyor. A carrier designated generally 16 includes a pair of end plates 18, 20 which are fixedly secured to each other by a horizontally extending rigid shaft 22 upon which is rotatably supported a sleeve 24. The carrier 16 may include additional frame members secured to and extending between end plates 18 and 20, however, such additional members have been omitted from the drawings in order to provide a clearer view of other parts of the assembly. The two end plates 18, 20 are supported upon rails 10 and 12 as by rollers 26. Carrier 16 is driven in movement along rails 10 and 12 by suitable drive means, not shown, which is operable to stop the carrier when the carrier is in operative alignment with work stations such as the work station W. Typically, several work stations will be located at uniformly spaced locations along the conveying path defined by rails 10 and 12, and the carriers 16 will be driven in intermittent movement along rails 10 and 12 in incremental steps from one work station to the next.

A panel support frame designated generally 28 is fixedly mounted upon the sleeve 24 as by mounting members 30, 32. The central mounting member 32 carries a pair of rollers 34 which ride against a vertical side surface 36 of the lower rail 12. The engagement between rollers 34 and the side surface 36 of rail 12 normally maintains the support frame 28 in the generally horizontal position shown in FIG. 1.

Upper rail 10 is formed as a continuous fixed rail entirely fixedly supported from the machine frame F. Lower rail 12 is formed with a relatively short moveable rail section 38 at each work station which normally is disposed in alignment with the fixedly mounted portions of lower rail 12. Rather than being mounted fixedly upon the fixed frame F, as are the remaining major portions of lower rail 12, moveable rail section 38 is mounted, as best seen in FIG. 2, upon a manipulator frame 40 which is supported as by rollers 42 mounted on each side of frame 40 which are received in curved roller tracks 44 mounted upon frame plates 46 fixedly secured to fixed frame F. The curvature of roller tracks 44 follows a constant radius curve centered on the axis of sleeve 24. A pneumatic motor including a cylinder or manipulator 48 coupled to frame F and a piston rod 50 coupled to manipulator frame 40 is employed to drive the manipulator frame in movement guided by roller tracks 44 from the normal position shown in full line in FIG. 2 in which the movable rail section 38 carried by manipulator frame 40 is in alignment with lower rail 12 and an actuated position in which frame 28 is shifted to the position shown in broken line in FIG. 2. When the manipulator frame 40 is in the full line position shown in FIG. 2, the support frame 28 is in the full line position of FIG. 2 with frame 28 lying in a horizontal general plane. When the piston rod 50 of the manipulator frame motor is retracted, the moveable rail section 38 moves from the full line position in clockwise movement about the axis of shaft 22, sleeve 24 rotating relative to shaft 22, and the weight of the horizontally projecting support frame maintains the rollers 34 on the frame support member 32 in contact with the rail section 38 so that the support frame 28 pivots downwardly from the full line position shown in FIG. 2 to the broken line position indicated.

Support frame 28 is provided with a number of locator and retaining members (not shown in FIG. 1) which are operable to releaseably retain and locate a body panel P on the underside of frame 28 when the frame is in its normal horizontal position shown in full line in FIG. 2. The number and locations of the locating and retaining members is entirely dependent upon the configuration of the particular panel P being handled. In FIG. 2, two locator members 52 are indicated in broken line as are two retainer members 54. The number and locations of locator members 52 and retaining members 54 as shown in FIG. 2. is intended simply to indicate the general manner in which panel P is retained upon support frame 28—in actual practice additional locator and retainer members will be employed. As most clearly shown in FIG. 2, a panel receiving frame 56 is fixedly mounted upon work frame W in a position and orientation to receive a panel P from support frame 28 when the frame 28 is in the broken line position indicated in FIG. 2. The panel receiving frame 56 will be provided with suitably located pads or locating members such as 58, 60 to support the panel upon the stationary receiving frame in a fixedly located position with respect to assembly tooling, such as the robotic welder R illustrated in FIG. 1. The panel receiving frame 56 may also be provided, where appropriate, with releasable clamps, not shown.

Also mounted at work station W is a clamp actuator assembly designated generally 64 which will be described in greater detail below. Clamp actuator assembly 64 functions to release the various releasable retainer members 54 or clamps which are mounted upon support frame 28 when the frame arrives at the broken line transfer position shown in FIG. 2. The panel receiving frame 56 may also mount one or more stationary release devices or pedestals 66 which mechanically release certain releasable locator members on support frame 28 in a manner to be described below.

As previously stated, FIGS. 1 and 2 are extremely simplified drawings intended simply to illustrate how the panel carrying support frame 28 is conveyed and manipulated. Thus, many structural details have been omitted from these two figures in that the scale of these figures, particularly FIG. 1, is too small to clearly illustrate details of the retaining and latch actuating mechanisms to which the present invention is directed and further because the configuration of support frame 28 and the location of the various locator and retaining devices upon the support frame will vary in accordance with the configuration of the specific panel being handled by the apparatus. Details of the locating and clamp actuating devices to which the present invention is directed are best seen in FIGS. 3-7.

Figure 3:
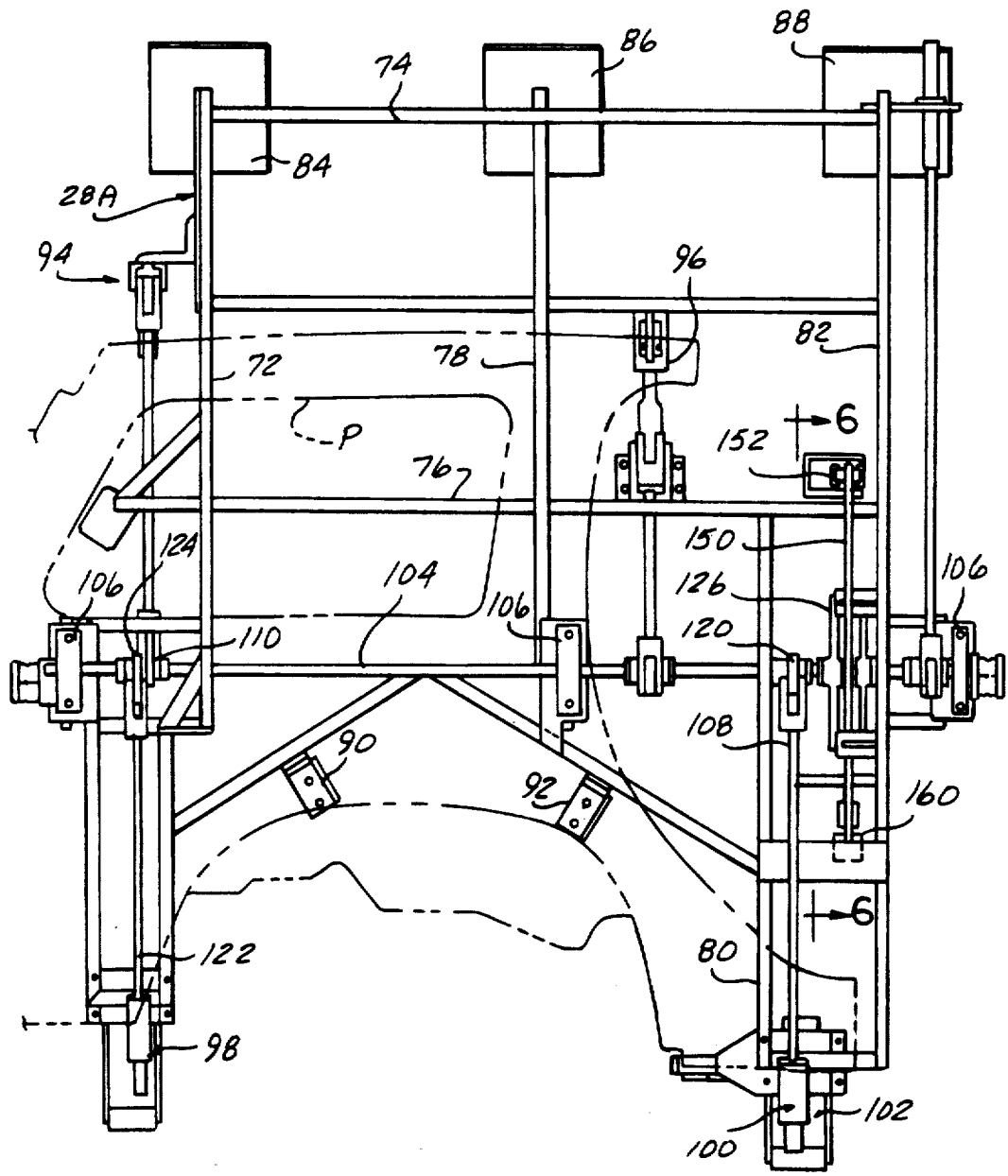
FIG. 3 is a top plan view of a support frame embodying the present invention with certain parts omitted for the sake of clarity.

Referring first to FIG. 3, a typical support frame designated generally 28A corresponding to the simplified frame 28 of FIGS. 1 and 2 is shown in top plan view as including an open frame work made up of rigidly interconnected longitudinally and transversely extending frame members such as 72, 74, 76, 80, 82, etc. The overall shape of the frame as viewed in plan depends to a large extent upon the overall shape of the panel P which is to be handled by the frame. Support frame 28A includes fixedly mounted mounting plates 84, 86 and 88 adapted to be fixedly mounted upon the mounting members such as 30, 32 of a carrier 16 referred to above in the description of FIGS. 1 and 2.

A number of fixedly mounted locator pads, two of which are indicated in FIG. 3 at 90 and 92 are fixedly mounted at selected locations upon frame 28A to function in the manner of locator pads 52 as shown in FIG. 2—that is to engage the outer side surface of the panel P which is located below frame 28A as viewed in FIG. 3. It will be appreciated that while only two stationary pads 90, 92 are illustrated, additional pads will be employed, where necessary.

A plurality of pivoted retainer or clamp assemblies designated generally 94, 96, 98 and 100 are mounted upon frame 28A to function in a manner similar to the retainer members 54 of FIG. 2. Again, the number and locations of retainer or clamp assemblies such as 94, 96 and their specific location upon the support frame is determined by the configuration of the panel P being handled. In addition to the pivoted retainer or clamp members 94, 96, 98 and 100, one or more retractable locator members, one of which is indicated generally at 102 in FIG. 3 may be mounted upon frame 28A. The fixed locating pads 90, 92, the pivotable retainer or latch assemblies such as 94, 96, etc., and the retractable locator members such as 102 all project downwardly from the lower side of frame 28A as viewed in FIG. 3 to locate the panel P in spaced relationship below the bottom side of frame 28A.

Mounted upon the upper side of frame 28A is a transversely extending shaft 104 supported upon frame 28A for rotation about its axis as by pillow block 106 mounted upon frame 28A.

Figure 4:
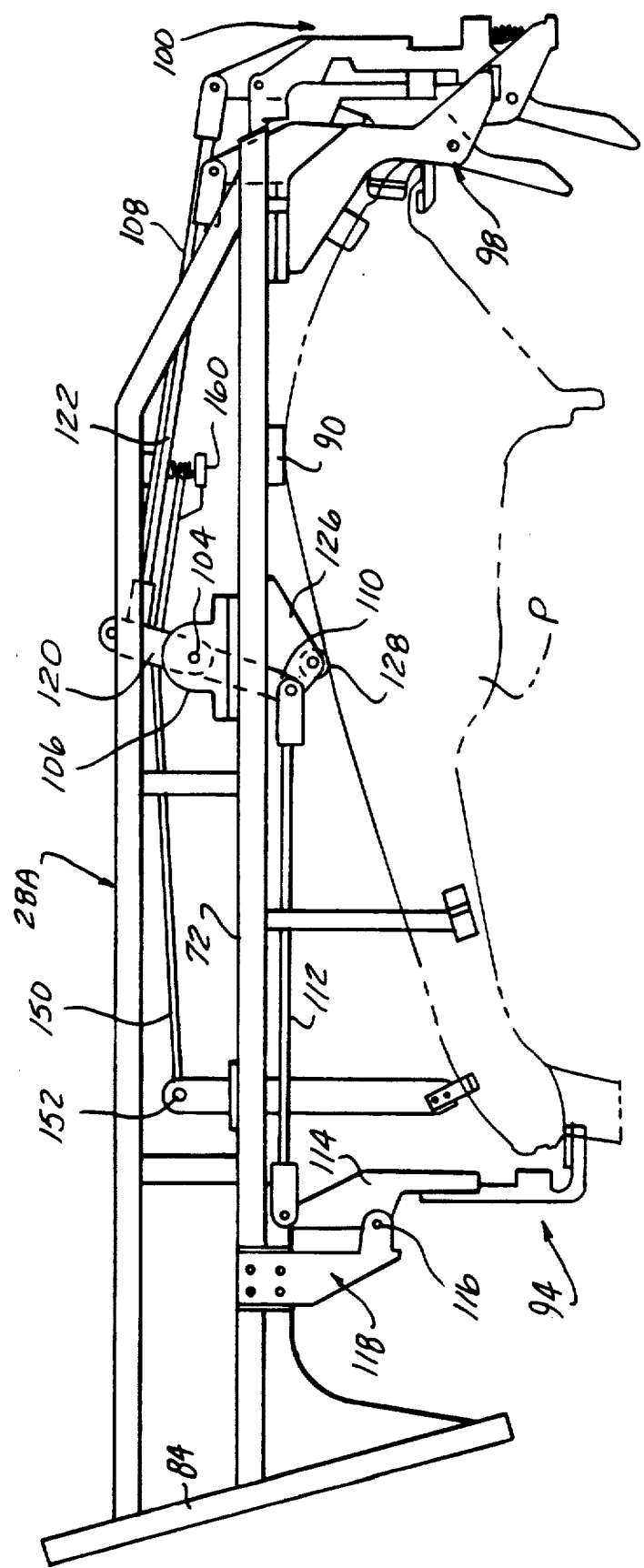
FIG. 4 is an end view of the support frame of FIG. 1, again with certain parts omitted.

As best seen in FIG. 4, a plurality of crank arms such as 120, 110 are rotatably fixed to shaft 104 to project upwardly or downwardly generally from the shaft. These crank arms are coupled by links to the various clamping or retainer assemblies 94, 96, 98 and 100, a link 112, for example, being pivotably connected at one end to the crank 110 and pivotably connected at its opposite end to a clamp retainer member 114 which is pivotally mounted as at 116 upon a mounting bracket 118 fixed to frame 28A. Another link 108 similarly extends from a crank 120 on shaft 104 to a pivotally mounted member of clamp assembly 100, while another link 122 extends from still another crank 124 on shaft 104 to the clamp assembly 98. The clamp assembly 96 of FIG. 3 is not shown in the side view of FIG. 4 for purposes of clarity.

In addition to the various clamp actuating cranks described above, a shaft actuating crank 126 is fixedly secured to shaft 104 and carries a roller 128 at its distal end. Crank 126, as best seen in FIG. 6, is formed with outwardly projecting arms 130, 132 which carry pads 134, 136 respectively engageable with abutments such as 138, 140 fixedly mounted upon frame 28A to establish end limits of rotary movement of shaft 104.

Figure 6:
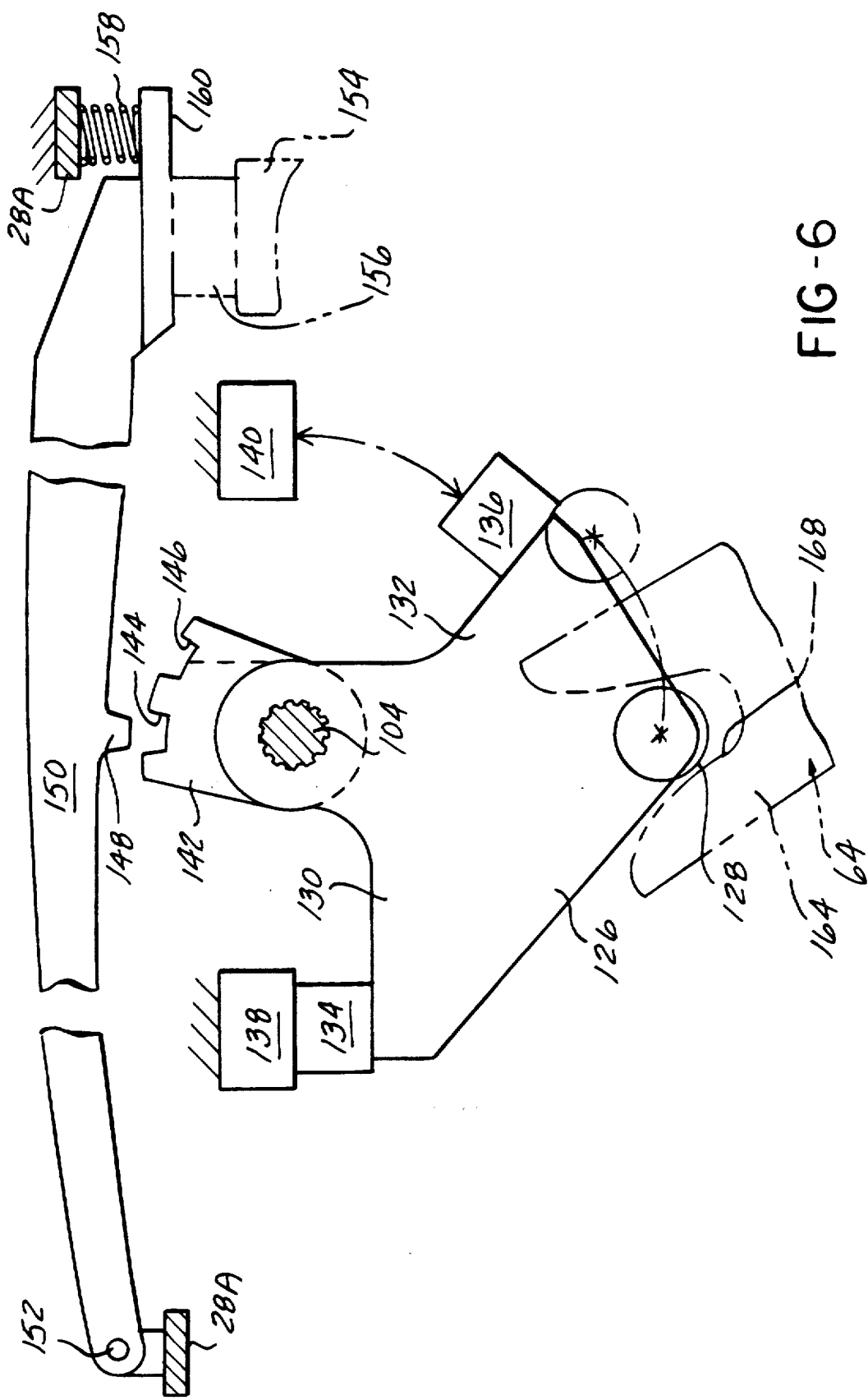
FIG. 6 is a detailed cross sectional view taken approximately on the line 6—6 of FIG. 3.

Also rotatively fixed to shaft 104 is a latch member 142 best seen in FIG. 6 having two angularly spaced recesses 144, 146 conformed to receive a latching pawl tooth 148 fixedly mounted upon an elongate latching lever 150 pivotably mounted at one end as at 152 on frame 28A. In FIG. 6, lever 150 is shown in the position which the lever would assume when the support frame 28A is in a lowered position adjacent a panel receiving frame at the work station—that is in the position corresponding to that of the frame 28 as shown in broken line in FIG. 2. When in this lowered position, a stationary latch release abutment 154 at the work station will engage a pad 156 at the distal end of lever 150 to pivot the lever 150 upwardly about pivot 152 as shown in FIG. 6, thereby locating the latch tooth 148 clear of latching member 142. Lever 150 is normally biased downwardly as viewed in FIG. 6 to engage the tooth 148 in the aligned recess 144 or 146 by a compression spring 158 engaged between the frame 28A and a spring seat 160 on lever 150. When tooth 148 is seated in either of recesses 144 or 146, shaft 104 is positively latched against rotation.

When the latching pawl tooth 148 is withdrawn clear of latch member 142, as shown in FIG. 6, shaft 104 may be driven in rotation about its axis by the clamp actuator assembly 64 mounted at work station W between the rotative end limits of movement established by the fixed frame stops 138 and 140. In that the support frame must be at its lower end limit of movement relative to the conveyor before the latch tooth 148 is disengaged, it follows that rotation of the shaft can be accomplished only when the panel support frame 28A is closely adjacent the panel receiving frame at the work station.

Figure 7:
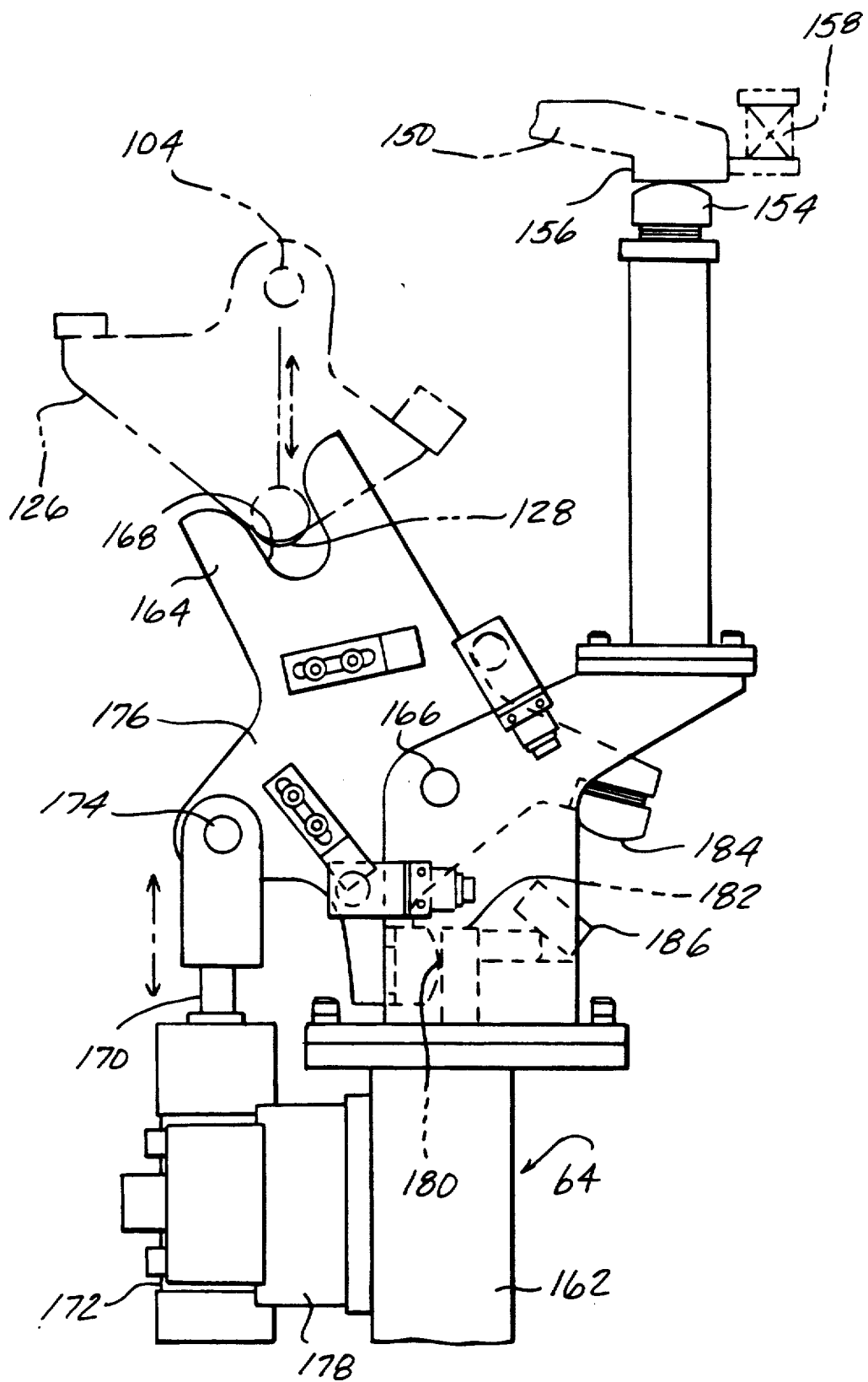
FIG. 7 is a side elevational view showing portions of the clamp actuating and pawl release devices employed at a work station.

Details of clamp actuator 64 are best seen in FIG. 7. The actuator includes a fixed frame 162 fixedly located at the work station. A drive member 164 is mounted for pivotal movement upon frame 162 as by a pivot pin 166. Drive member 164 is formed at its upper end with an upwardly opening U-shaped recess 168 whose width is somewhat greater than the diameter of the roller 128 welded on crank 126 of shaft 104. The piston rod 170 of a pneumatic cylinder 172 is pivotally coupled as at 174 to an arm 176 integrally formed on drive member 164. Pneumatic cylinder 172 is mounted, as by a trunnion mount 178, on fixed frame 162 and is shown in FIG. 7 with its piston rod 170 in a retracted position. At this time, a stop pad 180 fixedly mounted on drive member 164 is engaged with a fixed stop 182 mounted on fixed frame 162 to establish an end limit of movement of drive member 164 in a counterclockwise direction. Upon actuation of pneumatic cylinder 172 to extend its piston rod 170, drive member 164 will be driven in clockwise movement about pivot 166 until a second stop pad 184 mounted on drive member 164 engages a fixed stop abutment 186 on fixed frame 162. Cylinder 172 is connected in a conventional manner to a reversing valve to drive in either direction in accordance with the position of the valve. Control circuitry for controlling actuation of the cylinder 172 functions in a well known manner to maintain the piston rod at one end of its stroke until the circuit is actuated, at which time the piston rod is driven to the opposite end of its stroke and there maintained until the next subsequent actuation. Drive member 164 is thus normally located at one or the other of its end limit of pivotal movement about pivot pin 166.

In FIG. 7, drive member 164 is shown at that rotary end limit corresponding to a clamp closed position of crank 126. With drive member 164 in the position shown in FIG. 7 and crank 126 of shaft 104 in the position indicated in broken line, roller 128 on crank 126 will be located within recess 168 of the drive member when support frame 28A arrives at its lowered transfer position. With shaft 104 unlatched by the disengagement of latch tooth 148 from latch member 142, cylinder 172 may now be actuated to extend its piston rod upwardly as viewed in FIG. 7, thus causing drive member 164 to rotate clockwise about pivot 166 and in so doing to engage roller 128 to drive crank 126, and thus shaft 104 in counterclockwise rotation about the axis of shaft 104.

Referring now to FIG. 4, it is seen that if shaft 104 is rotated in a counterclockwise direction, this rotation of the shaft will cause crank 110 to draw link 112 to the right as viewed in FIG. 4, thus driving the pivoted clamp member 114 in clockwise movement about its pivot 116 to thereby withdraw the lower end of clamp 114 clear of the edge of the panel P. Similarly, those cranks, such as 108, on shaft 104 which project upwardly from the shaft will draw their respective links 122, 108, to the left as viewed in FIG. 4 to release the various clamps or retainer members coupled to the links. A subsequent actuation of cylinder 172 to retract its piston rod 170 would return the drive member 164, crank 126 and shaft 104 to the original positions illustrated in FIGS. 4, 6 and 7 to relocate the various clamps and retaining members in their clamping or retaining positions.

Three types of devices are employed to position or locate a body panel P relative to the support frame. These three devices are shown in FIG. 5.

Figure 5:
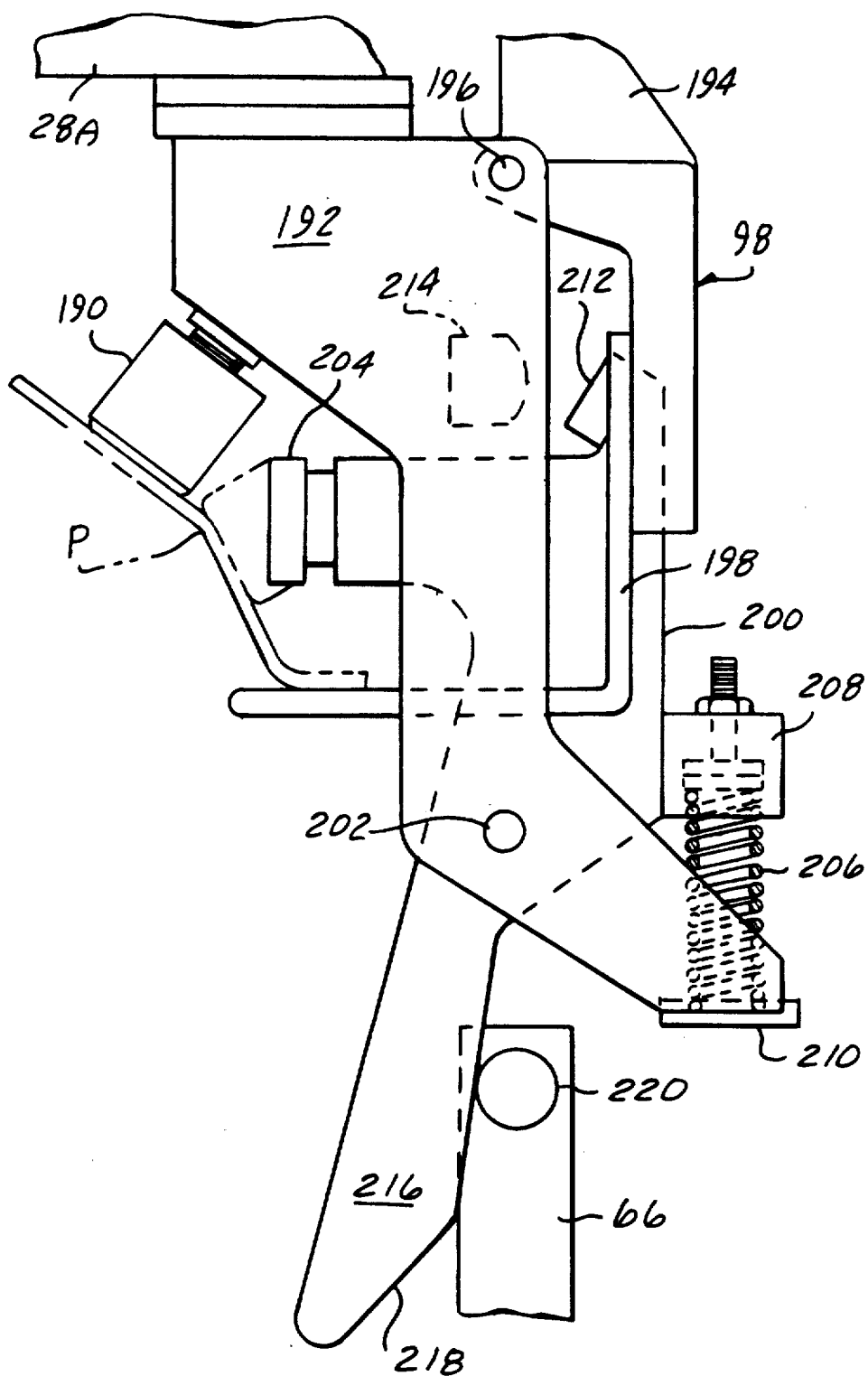
FIG. 5 is a detailed side view showing various forms of locating and retaining devices employed with the support frame of FIG. 3.

Referring to FIG. 5, the first type of positioning device takes the form of a pad like member such as 190 which is fixedly mounted with respect to frame 28A as by a mounting bracket 192 fixedly mounted upon frame 28A. The fixed mounting pads, such as pads 190 are employed to engage that surface of the panel P which faces the frame 28A to maintain a predetermined spacing between the panel surface and the main frame elements of the support frame.

A second type of device takes the form of a clamp or retaining member such as the assembly designated generally 98 in FIGS. 3 and 5. The assembly 98 includes a link portion 194 mounted on bracket 192 for pivotal movement about a horizontal axis as by a pivot pin 196. The upper end of link 194 is coupled to actuating shaft 104 as by link 122 and crank 124 (see FIG. 3). In the case of the assembly 98, an L-shaped member 198 is fixedly secured to the lower end of the link to project inwardly beneath and beyond the edge of the panel P when, the link 194 is shown in its clamping or panel retaining position shown in FIG. 5. Devices of the second type, such as the assembly 98 effectively clamp the panel P against the stationary retaining devices of the first type, such as pad 190 to cooperate with the stationary pads to retain the panel P against movement toward or away from the main elements of the support frame—i.e., movement of the panel upwardly or downwardly as viewed in FIG. 5. While the pad 190 and the panel engaging member 198 of link 194 function respectively as a fixed and a movable jaw of a clamp, the member 198 need not be, and typically is not, directly aligned with a fixed pad such as 190. For example, two or more pads 190 may be mounted on the support frame in laterally spaced apart positions and a single clamping element such as 198 may be located to engage the panel somewhere between the two pads.

A third type of locating device is employed to position or locate the panel laterally relative to the support frame. In FIG. 5, such a third type of device takes the form of a lever like member 200, mounted upon bracket 192 for pivotal movement about an axis established by pivot pin 202. Member 200 carries a panel engaging pad 204 which, upon pivotal movement of member 200, will move in a path having a horizontal component of movement as viewed in FIG. 5. A compression spring 206 engaged between a spring seat 208 on member 200 and a second spring seat 210 on bracket 192 resiliently biases member 200 in counterclockwise rotation about pivot 202 as viewed in FIG. 5. Movement of member 200 counterclockwise from the position shown in FIG. 5 is limited by a stop portion 212 on member 200 which can engage a stop abutment 214 fixed on bracket 192 to establish an end limit of counterclockwise movement of member 200.

In FIG. 5, the member 200 is shown in its disengaged position. Disengagement of member 204 from the panel P is desirable to facilitate loading and unloading of the panel P on or from the support frame. A number of locating devices such as the member 200, 204 will be located on the support frame at spaced locations around the entire perimeter of the panel and, when these locating devices are all engaged, they cooperatively retain the panel P against lateral (horizontal as viewed in FIG. 5) movement relative to the frame 28A in any direction. The "fit" of the panel between the engaged lateral positioning members is tight enough to present some problems in loading the panel on frame 28A. In that loading or unloading of the panel to or from the frame 28A is necessary only when the support frame 28A is in its lowered position for the purpose of transferring the panel between the support frame 28A and receiving frame 56, automatic disengagement of member 204 from the panel as the support frame 28A approaches its fully lowered position is accomplished by forming the member 200 with a downwardly projecting arm portion 216 formed along one edge with a cam surface 218. The panel receiving frame 56 is provided with a fixedly mounted pedestal such as 66 (see FIG. 2) which carries a roller 220 at its upper end located to engage cam surface 218 as support frame 28A approaches its fully lowered position to pivot member 200 in a clockwise direction about its pivot 202 against the action of spring 206 as the support frame moves into its fully lowered position. Upon subsequent elevation of support frame 28A away from its fully lowered position, cam surface 218 rolls along the roller until it finally clears, at which time spring 206 will drive member 200 in counterclockwise rotation about pivot 202 to move the pad 204 into the panel engaging broken line position indicated in FIG. 5.

OPERATION

The conveying path defined by conveyor rails 10 and 12 typically will extend past several work stations uniformly spaced along the conveyor path. At each work station, the conveyor will be provided with a manipulator assembly 48 operable to pivot the support frame 28 or 28A from the generally horizontal conveying position shown in FIG. 1 to and from a lowered position where the support frame is closely adjacent a panel receiving frame such as 56 (FIG. 2) at the work station. Depending upon the work operation to be performed, the panel receiving frame may be located in an inclined position such as that of the receiving frame 56 shown in FIG. 2 or the receiving frame may be located in a vertical position. Each work station will include a clamp actuator such as 64, a latch release abutment such as 154 and appropriate locator release devices such as 66.

The first station at the upstream end of the conveyor line is a loading station at which the panel P is loaded upon its support frame 28 or 28A. To accomplish this loading, the manipulator 48 at the loading station is actuated to lower the support frame to its lowered position at which the movable locating devices such as 200 are located in their disengaged position as illustrated in FIG. 5. If the various clamping devices, such as 98, on the frame are in their clamping position, clamp actuator 64 is actuated to release the clamps.

The panel P is then positioned on the frame 28A with the side surface of the panel facing frame 28A engaging all of the various fixedly mounted pads such as pad 190 (FIG. 5) on frame 28A. Clamp actuator 64 is then actuated as described above, to swing the various clamping assemblies such as 98 into the clamping position illustrated in FIG. 5.

The manipulator 48 is then actuated to swing the support frame, with the clamped panel, upwardly from the loading position to the generally horizontal position illustrated in FIG. 1. As the support frame moves upwardly from its fully lowered position, the various actuating cams such as 216 (FIG. 5) become disengaged from their releasing rollers 220 and are spring biased toward the adjacent panel surface to laterally position the panel relative to support frame 28A.

The support frame is then advanced along conveyor rails 10 and 12 to the first work station. Upon the arrival of the support frame at the first work station, the manipulator 48 at that station pivots the support frame downwardly toward the panel receiving frame, (such as frame 56 of FIG. 2). As the support frame approaches its fully lowered position, the cams 216 on the lateral positioning devices engage their various cam rollers 220 on the receiving frame to disengage the lateral positioning devices 200 from the panel and latch actuator pad 154 disengages latch tooth 148 to free shaft 104 for rotation. The roller 128 on the actuating shaft crank 126 moves downwardly into the U-shaped recess 168 of actuating device 64 (FIG. 7). The actuating device 64 is then actuated to drive its drive member 164 in the clamp opening direction, this movement of drive member 164 driving crank 126 to rotate the actuating shaft 104. As described above, actuating shaft 104 is coupled by cranks on the shaft and links to the various clamping devices such as 98 to pivot the various clamping devices to withdraw the panel supporting elements, such as 198, from beneath the panel P. Support of the panel P is then transferred to the panel receiving frame. The support frame 28A is then driven by the manipulator device 48 at the work station back to its elevated horizontal position to fully expose the panel P supported upon receiving frame 56 to tooling located at the work station.

After the work operation on the panel has been completed, the tooling is withdrawn from the panel and the support frame 28A is again driven by the manipulator back to its lowered position, the lateral locating devices such as 200 (FIG. 5) being shifted to their disengaged position as the support frame moves to its fully lowered position by the engagement of the cams 216 with the releasing rollers such as 220 (FIG. 5) and latch tooth 148 being again disengaged. The panel is then transferred from the receiving frame 56 back into engagement with the various fixed pads such as 190 as in the original loading operation, the clamp actuator 64 is actuated to restore the various panel retaining clamping devices such as 98 to their panel clamping position, and the manipulator 48 is then actuated to swing the panel upwardly away from the receiving frame back to the substantially horizontal conveying position. During the initial stages of this upward movement, the lateral locating devices are released to return to their panel engaging positions to laterally locate the panel and latch tooth 148 is again engaged to rotatively lock shaft 104.

This process is then repeated at succeeding work stations with the panel being finally unloaded from the support frame 28A at the final work station.

As described above, the actuating shaft 104 and thus all of the pivotal clamps are positively retained in the position to which they have been last driven by a clamp actuator 64 by the engagement of the latching tooth 148 (FIG. 6) in either of recesses 144, 146. The only time latch tooth 148 is disengaged from latch member 142 is when the support frame 28A is at a closely adjacent fully lowered position. From the foregoing description of an operating cycle, it is believed apparent that all of the various shaft actuated clamps, such as clamp 98, are latched in their clamping position at all times except when support frame 28A is either at or closely adjacent a fully lowered position at a work station or the panel P is supported by the panel receiving frame at a work station.

While one embodiment of the invention has been described in detail, it will be apparent to those skilled in the art the disclosed embodiment may be modified. Therefore, the foregoing description is to be considered exemplary rather than limiting, and the true scope of the invention is that defined in the following claims.

I claim:

1. An article handling apparatus for transferring articles in the form of relatively large panels or the like to and from a work station, said apparatus comprising:

a support frame adapted to support a panel at one side thereof;

locating means mounted on said frame for engaging and locating a panel in a predetermined position upon one side of said frame;

releasable retainer means mounted on said frame for movement between a clamping position wherein said retainer means engages said panel to cooperatively retain said panel engaged with said locating means and a release position clear of said panel to accommodate movement of said panel into or out of engagement with said locating means;

actuator means mounted on said frame for movement relative to said frame between a first position and a second position;

coupling means coupling said actuator means to said retainer means to locate said retainer means in said clamping position when said actuator means is in said first position and to locate said retainer means in said release position when said actuator means is in said second position;

reversible drive means at said work station selectively operable when said frame is at said work station to engage and drive said actuator means in movement relative to said frame to shift and actuator means from one of said first and second positions to the other; and manipulating means operable when said frame is at said work station to shift said frame from an elevated position to a lowered position wherein said actuator means is engageable with said reversible drive means.

2. An article handling apparatus for transferring articles in the form of relatively large panels or the like to and from a work station, said apparatus comprising:

a support frame adapted to support a panel at one side thereof;

locating means mounted on said frame for engaging and locating a panel in a predetermined position on one side of said frame;

releasable retainer means mounted on said frame for movement between a clamping position, wherein said retainer means engages said panel to cooperatively retain said panel engaged with said locating means, and a release position clear of said panel to accommodate movement of said panel into or out of engagement with said locating means;

an actuating member mounted on said frame for movement relative to said frame between a first position and a second position;

coupling means coupling said actuating member to said retainer means to locate said retainer means in their respective clamping positions when said actuating member is in said first position and to locate said retainer means in said release position when said actuating member is in said second position;

reversible drive means at said work station selectively operable when said frame is at said work station to engage and drive said actuating member in movement relative to said frame to shift said actuating member from one of said first and second positions to the other;

conveying means for conveying said frame along a fixed path extending past said work station with said frame in an elevated position; and manipulating means associated with said conveying means operable when said frame is at said work station to shift said frame from said elevated position to a lowered position wherein said actuating member is engageable with said reversible drive means.

3. The invention defined in claim 2 further comprising releasable latch means on said frame engageable with said actuating member to positively latch said actuating member in either of its first or second positions, means normally biasing said latch means into latching engagement with said actuating member, and first release means at said work station for releasing said latch means in response to movement of said frame to said lowered position.

4. The invention defined in claim 2 wherein said locating means comprises a first locating member fixedly mounted on said frame to engage that side of said panel facing generally toward said frame, and a second locating member mounted on said frame for pivotal movement relative to said frame into and out of engagement with a surface of said panel inclined from said frame, means biasing said second member into engagement with said panel, and second release means at said work station engageable with said second member to move said second member out of engagement with said panel in response to movement of said frame to said lowered position.

5. The invention defined in claim 2 wherein said actuating member comprises a shaft mounted on said frame for rotary oscillation about a shaft axis fixed relative to said frame between first and second rotary end limits respectively establishing said first and second positions of said actuating member, and crank means fixed to said shaft, said drive means including a drive member mounted for movement in either direction along a fixed path between first and second end limits, said drive member including means drivingly engageable with said crank means when said frame is in said lowered position and said shaft and said drive member are both at their respective first or respective second end limits, and power means selectively operable to drive said drive member in either direction between its first and second end limits.

6. The invention defined in claim 5 wherein said crank means includes a crank portion and a roller mounted on said crank portion for rotation about an axis parallel to and offset from said shaft axis, and said drive member comprises an arm mounted at said work station for rotation in either direction about a fixed arm axis parallel to said shaft axis and having a U-shaped recess adapted to receive said roller when said support frame is in said lowered position.

7. A panel handling apparatus for transferring an automotive body panel or the like having an outer side, an inner side, and peripheral edge to and from a work station, said apparatus comprising:
a support frame having a first side;
first locating means at said first side of said support frame engageable with said outer side of said panel to locate said panel in a predetermined position on said support frame with said outer side of said panel facing said first side of said support frame;
a plurality of releasable clamp means on said frame operable in respective clamping positions to retain said panel in engagement with said first locating means and operable in respective release positions to accommodate movement of said panel into or out of engagement with said first locating means;
conveying means for conveying said support frame along a horizontal conveying path extending past said work station with said support frame disposed in a substantially horizontal conveying position with said first side facing downwardly;
manipulating means on said conveying means operable when said support frame is aligned with said work station to pivot said support frame relative to said conveying means between said conveying position and a transfer position wherein said first side of said support frame is inclined downwardly from said conveying means;
a panel receiving frame at said work station having a panel receiving side located to be in spaced opposed relationship to said first side of said support frame when said support frame is in said transfer position;
actuator means mounted on said support frame for movement between a first and a second position and coupled to all of said plurality of clamp means to locate all of said clamp means in their clamping positions when said actuator means is in said first position and to locate all of said clamp means in their release position when said actuator means is in said second position;
releasable latch means on said frame for latching said actuator means in either of said first and second positions;
latch release means at said work station for releasing said latch means when said support frame is in said transfer position; and
actuator drive means at said work station engageable with said actuator means when said support frame is in said transfer position selectively operable to drive said actuator means from either of said first and second positions to the other.

8. The invention defined in claim 7 wherein said first locating means comprises a plurality of pad members fixedly mounted on said support frame and projecting outwardly from the first side of said support frame, and said clamp means each comprising a clamping member projecting inwardly beyond the edge of said panel to engage the inner side of said panel when the clamp means is in its clamping position and withdrawn outwardly from the panel edge when the clamp means is in its released position.

9. The invention defined in claim 7 further comprising:
a plurality of second locating means mounted on said support frame for movement between respective normally maintained panel engaging positions and inactive withdrawn positions, said second locating means when in their respective engaged positions being located on said support frame to engage said panel at spaced locations around its peripheral edge cooperatively retaining said panel against lateral movement relative to said support frame from its predetermined position and said second locating means when in their respective withdrawn positions being withdrawn out of engagement with said panel when the panel is in its predetermined position; and
second release means at said work station operable to actuate said second locating means from one of said respective engaged positions or said withdrawn positions to the other of said respective engaged positions or said withdrawn positions when said support frame is within a predetermined distance from its transfer position.

10. The invention defined in claim 7 wherein said actuator means comprises a shaft mounted on said support frame for rotation between first and second end limits respectively establishing said first and second positions of said actuator means, an actuating crank fixed to said shaft, and a plurality of crank-link means coupling said shaft respectively to said plurality of clamp means, and said actuator drive means comprises a drive member at said work station engageable with said actuator crank when said support frame is in said transfer position, and power means selectively operable to drive said drive member in movement causing said actuator crank means to rotate said shaft from one of said first and second limits to the other.

11. The invention defined in claim 10 wherein said latch means comprises a latch member rotatively fixed to said shaft, an elongate latch lever pivotally mounted at one end upon said support frame, interengageable teeth means on said latch member and latch lever engageable when said lever is in a latching position to lock said shaft at either of said first and second end limits, spring means biasing said lever toward said latching position, and said latch release means comprises a stationary abutment engageable with said lever as said support frame approaches said transfer position to pivot said lever away from said latch member to disengage said teeth means to accommodate rotation of said shaft.

12. The invention defined in claim 10 wherein said actuating crank includes a roller mounted at the distal end of said crank, and said drive member comprises an arm mounted at one end for pivotal movement about a drive axis and having a U-shaped recess at its opposite end adapted to receive said roller when said support frame is in said transfer position.

13. The invention defined in claim 12 wherein said power means comprises pneumatic motor means having a piston rod coupled to said arm to drive said arm in pivotal movement about said drive axis.

* * * * *